US008459015B1

(12) United States Patent
Coletta (10) Patent No.: US 8,459,015 B1
(45) Date of Patent: Jun. 11, 2013

(54) SYSTEM FOR USE WITH AN INTERNAL COMBUSTION ENGINE EFFECTIVE FOR INCREASING POWER AND IMPROVING FUEL USAGE

(76) Inventor: Timothy C. Coletta, Maineville, OH (US)

(*) Notice: Subject to any disclaimer, the term of this patent is extended or adjusted under 35 U.S.C. 154(b) by 0 days.

(21) Appl. No.: 13/373,340

(22) Filed: Nov. 10, 2011

Related U.S. Application Data

(63) Continuation-in-part of application No. 12/383,440, filed on Mar. 24, 2009, now abandoned.

(51) Int. Cl.
*F01N 3/02* (2006.01)
(52) U.S. Cl.
USPC .......... 60/309; 60/278; 60/279; 60/298; 60/320; 123/1 A; 123/518; 123/524; 123/568.15
(58) Field of Classification Search
USPC .......... 60/272, 274, 278, 279, 287, 292, 60/298, 309, 320, 324; 123/1 A, 518, 524, 123/568.15, 698
See application file for complete search history.

(56) References Cited

U.S. PATENT DOCUMENTS

| | | | |
|---|---|---|---|
| 2,403,774 A | 3/1945 | Whitty et al. | |
| 2,708,824 A * | 5/1955 | Engstrom | 60/310 |
| 3,672,340 A | 6/1972 | Bomba | |
| 3,672,341 A | 6/1972 | Smith et al. | |
| 3,983,882 A | 10/1976 | Billings | |
| 4,112,875 A | 9/1978 | Fletcher et al. | |
| 4,114,370 A * | 9/1978 | Woods | 60/279 |
| 4,503,813 A | 3/1985 | Lindberg | |
| 4,671,899 A | 6/1987 | Coletta | |
| 5,097,803 A | 3/1992 | Galvin | |
| 5,957,113 A | 9/1999 | Masaki et al. | |
| 6,122,908 A * | 9/2000 | Wirmark | 60/274 |
| 6,289,853 B1 | 9/2001 | Walczak et al. | |
| 6,716,398 B2 | 4/2004 | Caren et al. | |
| 6,866,092 B1 | 3/2005 | Molivadas | |
| 7,040,088 B2 * | 5/2006 | Covit | 60/300 |
| 7,281,531 B1 | 10/2007 | Fulton et al. | |
| 7,302,795 B2 * | 12/2007 | Vetrovec | 60/309 |
| 7,370,609 B2 * | 5/2008 | Kamio | 123/1 A |
| 7,661,416 B2 * | 2/2010 | Sasajima et al. | 123/568.12 |
| 8,151,553 B1 * | 4/2012 | Schechter | 60/279 |
| 2008/0148721 A1 | 6/2008 | Wirth et al. | |

OTHER PUBLICATIONS

David E. Sakrisson, Waster and Steam Injection plus Gasification Systems, 1980-2008, Internet Web Pg. http://desakrisson.topcities.com/watinj.html.
International Search Report for Application No. PCT/US10/00789, Int. Filing date (Mar. 16, 2010).
International Written Opinion for Application No. PCT/US10/00789, Int. Filing date (Mar. 16, 2010).

* cited by examiner

*Primary Examiner* — Binh Q Tran
(74) *Attorney, Agent, or Firm* — Mark F. Smith; Smith Brandenburg Ltd (57) ABSTRACT

The present invention relates to an internal combustion engine and, more particularly, an internal combustion engine having a new and novel system for improving the efficiency of the engine. In a preferred embodiment the system comprises an expander effective for receiving condensed engine exhaust and placing said exhaust in contact with copper or a copper alloy and for transforming the exhaust into vapor for transfer into the combustion chamber of the engine. In a preferred embodiment the system further comprises a condenser means for cooling the exhaust exiting the engine sufficiently to condense any water vapor and/or fuel vapor to form a liquid mixture or water and fuel, collecting and storing the liquid mixture, and directing the stored liquid mixture to the expander.

16 Claims, 13 Drawing Sheets

SYSTEM FOR USE WITH AN INTERNAL COMBUSTION ENGINE EFFECTIVE FOR INCREASING POWER AND IMPROVING FUEL USAGE

CROSS-REFERENCE TO RELATED APPLICATION

The present invention is a continuation-in-part of and claims benefit to U.S. patent application Ser. No. 12/383,440, filed Mar. 24, 2009 now abandoned, entitled: Internal Combustion Engine Having A Water Injection System Effective For Improving Fuel Usage.

BACKGROUND OF THE INVENTION

The present invention is directed to a system for use with an internal combustion engine and, more particularly, to a system for use with an internal combustion engine that is effective for increasing power and improving the fuel usage of the engine.

Standard internal combustion engines rely upon a pressure differential to move the fuel/air mixture into the combustion chamber associated with each cylinder. During the intake stroke of the piston of a conventional engine, the piston recedes in the cylinder bore and the inlet valve is simultaneously opened at the inlet port to admit the fuel/air mixture. The receding piston creates a partial vacuum in the combustion chamber and throughout the intake manifold. This vacuum draws air through the carburetor where, in the typical jet-type carburetor or fuel injector systems, liquid fuel droplets are sprayed into the intake air to create a misty fuel/air mixture.

The nature and quality of the combustion of the fuel/air mixture in the combustion chamber depends upon numerous factors. One of the most significant of these factors is the degree to which the fuel droplets released by the carburetor or fuel injectors are atomized and vaporized on their way to or within the combustion chamber. Ideally, the fuel/air mixture in the combustion chamber should be in a gaseous state. However this is not typically achievable in conventional internal combustor engines. Fuel in a liquid state, suspended in the combustion chamber as a mist or droplets, will often not ignite. Such unvaporized fuel that does not burn completely during the combustion stroke of the cylinders is expelled into the exhaust system where it either continues to burn, heating the engine and requiring surplus pollution control devices or is vaporized and exhausted out into the atmosphere.

Water injection, has been known and used for many years to increase the power output of the engine without the need of additional fuel, as well as for use in increasing gas mileage, reducing engine knocking, reducing engine operating temperature, reducing carbon deposits in the engine, and for reducing detrimental emissions such as nitrous oxide emissions (N2O), commonly referred to as NOX. Prior art water injection systems have included both complex and expensive systems and relatively simple and inexpensive systems. Unfortunately, all such systems have required the use of relatively large reservoirs for containing and providing supply water for injection into the fuel intake of the engine. This requires that vehicle manufacturers must provide a substantial amount of space in already space limited areas of most passenger vehicles as well as significantly increasing the weight of the vehicle. Further, the user must refill the reservoirs with water after a relatively short period of use. With more stringent and demanding state and federal fuel mileage regulations, automobile and truck manufacturers have been under pressure to develop vehicles having significant increases in fuel mileage performance often resulting in more demanding limitations on space and weight considerations.

Accordingly, it would be desirable to have a system that for use with an internal combustion engine that increases the efficiency of the engine, reduces pollutants, reduces the amount of unburnt fuel from being expelled into the atmosphere, increases the power and reduced fuel consumption of the engine while minimizing the amount of space and weight increases.

SUMMARY OF THE INVENTION

The system of the present invention is effective for increasing the power and reducing the fuel consumption of an internal combustion engine having an intake and an exhaust, the system comprises an exhaust intake for receiving a portion of the exhaust from an internal combustion engine, an elongated conduit formed from copper, a copper alloy, or having a copper plated inner core surface for contacting the exhaust and for directing the portion of the exhaust to an expander effective for receiving the portion of the exhaust and vaporizing (evaporating) any water and unburned fuel, and an output hose for directing the water and unburned fuel vapor to the engine intake.

In a preferred embodiment of the invention, the internal combustion engine has a fuel supply for providing fuel to a combustion chamber and an exhaust manifold for discharging exhaust from the combustion chamber.

In a preferred embodiment of the invention the elongated input conduit is formed from copper or a copper alloy or any other suitable catalyst effective for Nitrogen Oxide (nitrous oxide) reduction.

Another preferred embodiment the system includes a condenser for condensing any water vapor and/or fuel vapor to form a liquid mixture of water and fuel and storing the liquids for future use.

In another preferred embodiment of the invention the condenser means having one or more cooling surfaces having passages therein for receiving cooling fluid effective for cooling said cooling surfaces and for dissipating heat there from.

In another preferred embodiment of the invention the condenser means includes an expansion chamber for expanding any vaporizing any fluids in the portion of the exhaust.

In another preferred embodiment of the invention the cooling surfaces forms a muffler for reducing the sound of the engine.

In another preferred embodiment of the invention the system comprises a water injection system comprising means for heating fuel prior to entering the combustion chamber.

In a preferred embodiment of the invention the condenser means is fluidly connected to the engine's primary cooling system.

In a preferred embodiment of the invention the system comprises means for vaporizing water prior to entering the combustion chamber.

A preferred embodiment of the invention, the method of injecting water into the fuel intake of the engine comprises the steps of cooling the exhaust exiting the engine sufficiently to condense any water vapor and/or fuel vapor to form a liquid mixture of water and fuel, collecting the condensed liquid, and directing the condensed liquid to an expander to expose the liquid to a copper or a copper alloy catalyst and for transforming the liquid into a vapor state and directed the vapors to the engine.

In another preferred embodiment of the invention, the method comprises mixing the condensed liquid with the fuel contained in the fuel tank.

In another preferred embodiment of the invention, the method comprises mixing the vapors with fuel entering the intake manifold of the engine.

In another preferred embodiment of the invention, the method comprises using a condenser means having a plurality of cooling coils having fluid circulating therein for dissipating heat.

In another preferred embodiment of the invention, the method comprises using a plurality of coils in fluid communication with a fluid cooling system for circulating and dissipating fluid within the coils.

In another preferred embodiment of the invention, the method comprises using the engines primary cooling system for cooling the exhaust to condense any water vapor and/or fuel vapor.

In another preferred embodiment of the invention, the method comprises using fuel within the fuel line to cool the exhaust gas.

In another preferred embodiment of the invention, the method comprises monitoring the engine performance and demand and regulating the amount of exhaust vapors being mixed with the fuel entering the engine intake.

Other objects, advantages, and embodiments of the invention will be apparent from the following description, the accompanying, drawings, and the appended claims.

BRIEF DESCRIPTION OF THE DRAWINGS

To provide a more complete understanding of the present invention and further features and advantages thereof, reference is now made to the following description taken in conjunction with the accompanying drawings, in which.

DETAILED DESCRIPTION OF THE INVENTION

The present invention relates to an internal combustion engine and, more particularly, a system for use with an internal combustion engine. The present invention relates to an internal combustion engine and, more particularly, an internal combustion engine having a new and novel system for improving the efficiency of the engine. In a preferred embodiment the system comprises an expander effective for receiving condensed engine exhaust and placing said exhaust in contact with copper or a copper alloy and for transforming the exhaust into vapor for transfer into the combustion chamber of the engine. In a preferred embodiment the system further comprises a condenser means for cooling the exhaust exiting the engine sufficiently to condense any water vapor and/or fuel vapor to form a liquid mixture or water and fuel, collecting and storing the liquid mixture, and directing the stored liquid mixture to the expander. The system includes a method of transferring a portion of the exhaust through a conduit formed from copper, a copper alloy, or having an inner core plated with copper or a copper alloy. The system further includes a new and novel injection system for improving the efficiency of the engine. In a preferred embodiment the system comprises a condenser for cooling the exhaust exiting the engine sufficiently to condense any water vapor and/or fuel vapor to form a liquid mixture of water vapor and fuel, collecting the condensed liquid, and mixing the liquid with fuel being directed into the engine. In another preferred embodiment of the invention the condensed liquid is directed to a reservoir and then directed to an expander canister for transformation of the condensed liquid into a vapor state and transferring the vapor to the inlet of the engine. Preferred embodiments of the condenser means for cooling the exhaust include, but are not limited to, a water jacket having cooling coils for cooling the exhaust traveling through the exhaust pipe, cooling coils positioned along the outer surface of the exhaust pipe, and a muffler canister having cooling coils for cooling the exhaust flowing through the muffler canister. A detailed description of such condenser means for cooling the exhaust is provided herein. In describing the preferred embodiments of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose.

Although specific embodiments of the invention are heredescribed with references to the drawings, it should be understood that these embodiments are simply illustrative examples of but a small number of the many possible specific embodiments which can represent applications of the principles of the invention. It should also be understood that the range of possible embodiments employing combinations of these several means is broad and more variations incorporating means for cooling the exhaust or transferring a portion of the exhaust to an expander canister and that such variations, along with other changes and modifications that may be obvious to one skilled in the art to which the invention pertains, are deemed to be within the spirit, scope, and contemplation of the invention as further defined in the appended claims.

A preferred embodiment of the invention is a method of injecting water into the fuel intake of the engine comprises the steps of cooling the exhaust exiting the engine sufficiently to condense any water vapor and/or fuel vapor to form a liquid mixture of water vapor and fuel, collecting the condensed liquid in a reservoir. The condensed liquid can then be stored or transferred to an expander canister for being transformed back into a vapor state and then mixed with fuel vapor or droplets being directed into the engine. In a preferred embodiment, the method comprises mixing the condensed liquid with the fuel contained in the fuel tank. In another preferred embodiment of the invention the method comprises mixing the condensed liquid with the fuel entering the intake manifold of the engine. In another preferred embodiment of the invention the step of cooling the exhaust comprises a muffler canister for condensing the water vapor and/or fuel vapor of the exhaust. In another preferred embodiment of the invention the condenser means comprises a cooling jacket for condensing the water vapor and/or fuel vapor of the exhaust. In another preferred embodiment of the invention the method comprises using fuel within the fuel line to cool the exhaust. In another preferred embodiment of the invention the method comprises the step of monitoring the engine performance and demand and regulating the amount of vaporized liquid being directed into the engine.

Figure 1:
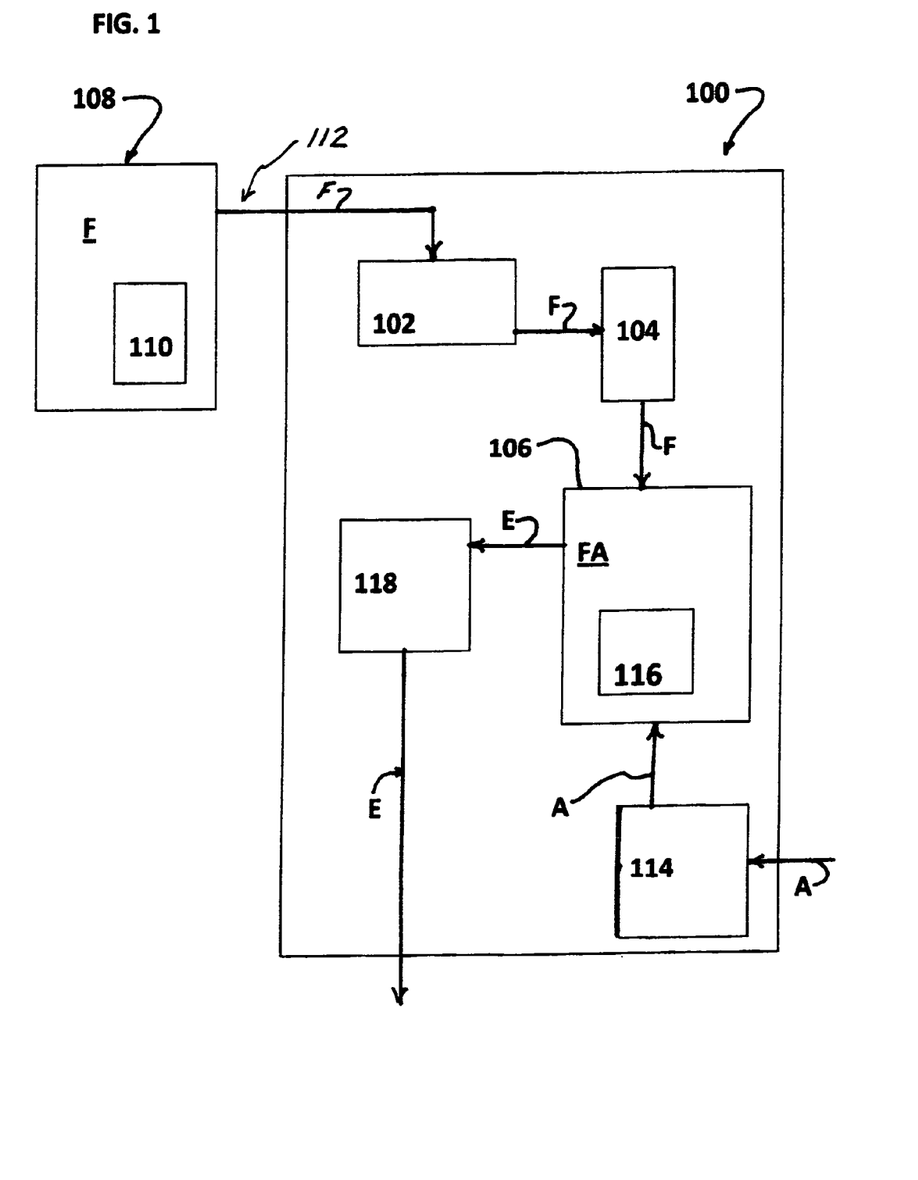
FIG. 1 is a schematic illustration of a convention internal combustion engine.

Referring to FIG. 1, a diagrammatical illustration of a conventional internal combustion engine 100 is shown having a fuel intake 102 for feeding fuel to a plurality of fuel injectors 104 and to corresponding combustion chambers 106. A fuel tank 108 containing fuel F includes a fuel pump 110 which operates to pump fuel F from the fuel tank 108 to the fuel intake 102 of the engine 100 through a fuel line 112. The combustion chambers 106 receives fuel F from the fuel injectors 104 and receives air A from an air intake 114 which takes outside air A and directs the appropriate amount of air A into the combustion chambers 106. The fuel and air FA mixture in the combustion chambers 106 is then subjected to a spark plug or other ignition means 116 which begins combustion. The resulting exhaust E is then discharged from the combustion chambers 106 to at least one exhaust manifold 118 which receives the exhaust E and directs the exhaust E to and through at least one exhaust pipe 120 for discharging the exhaust E into the outside air (atmosphere) A. The operation of such an internal combustion engine is well known and therefore requires no additional elaboration. Further, due to this broad range of possible embodiments, descriptive details in this application are primarily devoted to mechanical configurations that cyclically apply. More specifically, rather than discussing descriptive details of internal combustion engines, sound reducing mechanisms, and engine cooling systems, this description purposely limits discussion of many aspects of the invention pertaining to the former since they are but a subset of the latter.

Figure 2:
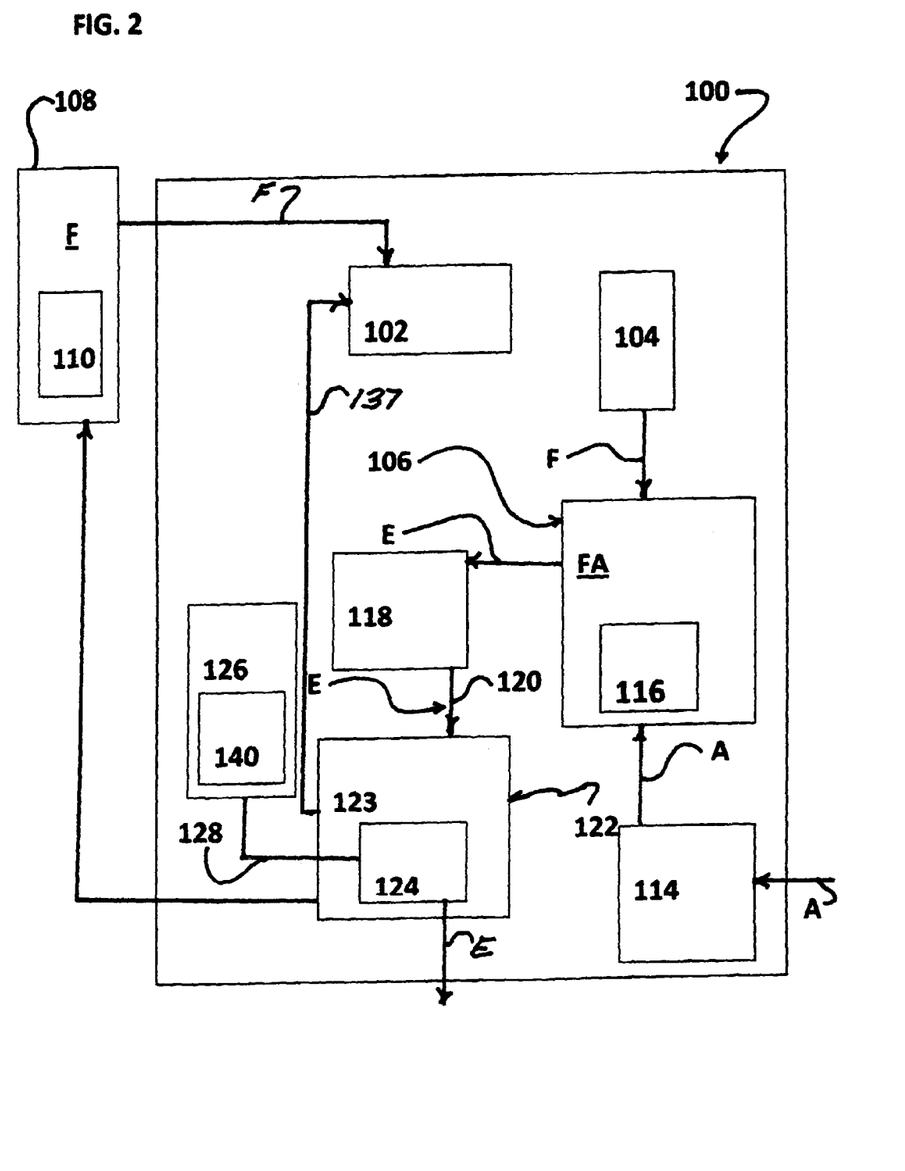
FIG. 2 is a schematic illustration of the internal combustion engine of FIG. 1 showing the water injection system of the subject invention having a condenser means comprising a cooling jacket for cooling the exhaust of the engine.
Figure 3:
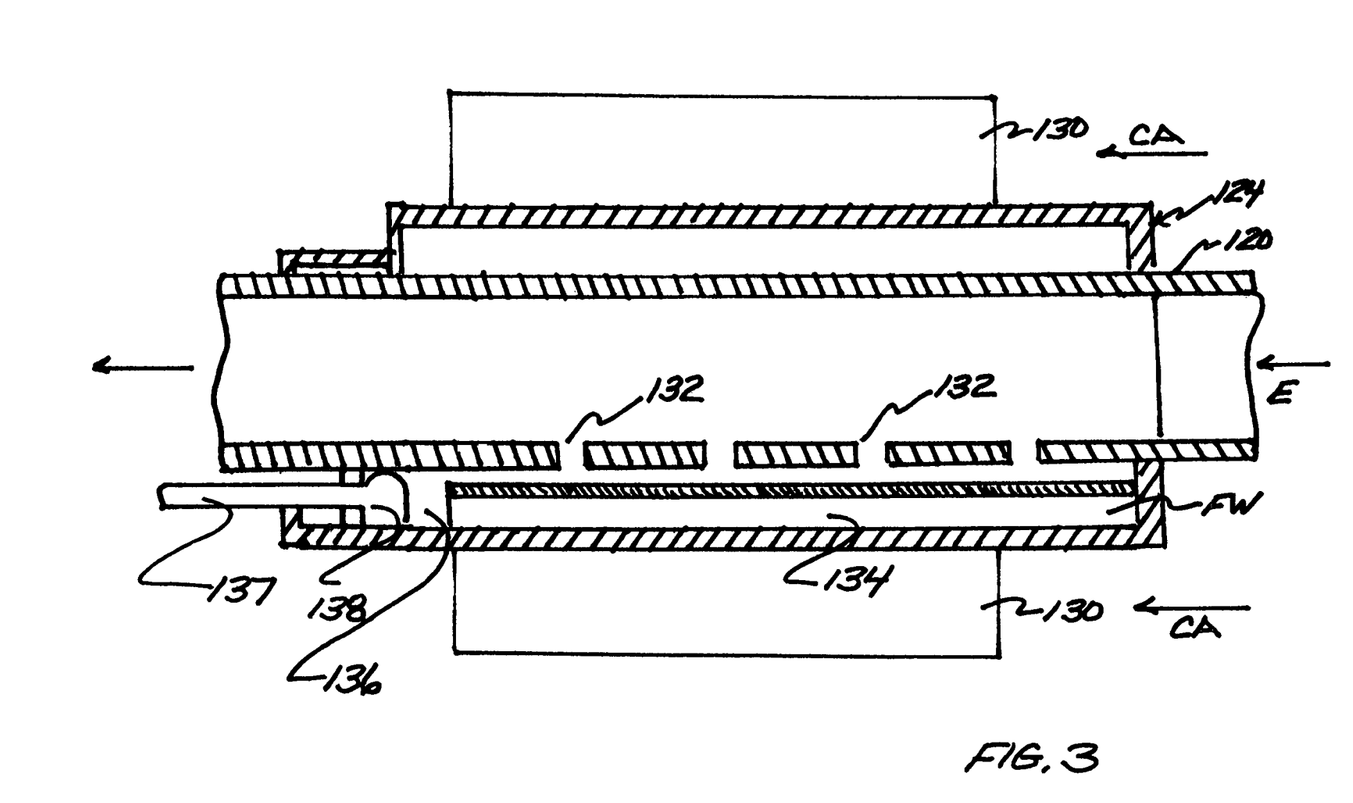
FIG. 3 is a schematic illustration of the cooling jacket of FIG. 2.

In a preferred embodiment of the invention, as shown in FIGS. 2 and 3, the engine 100 is provided with the system 122 of the subject invention having a condenser means 123. The exhaust pipe 120 is a straight, winding or serpentine configuration. In a preferred embodiment the condenser means 123 comprises a cooling jacket 124 coupled to the engine's primary cooling system 126, such as a radiator, by a tube or hose 128 for circulating cooling fluid through the cooling jacket 124 and the engine's primary cooling system 126. In a preferred embodiment the cooling jacket 124 includes a plurality of cooling fins 130 mounted along the surface of the cooling jacket 124. In a preferred embodiment the cooling fins 130 are formed from a metallic material, such as aluminum, and provide a relatively large cooling surface that cooperate with cooling air CA flowing along the external surface of the exhaust pipe 120 and the cooling jacket 124 to dissipate the heat of the exhaust E flowing through the exhaust pipe 120. It has been found that with sufficient cooling of the exhaust E any unburned fuel vapor and water vapor within the exhaust E condenses back into their liquid states.

In another preferred embodiment of the invention the exhaust pipe 120 is further provided with one or more apertures 132 that permit the fuel and water mixture FW that has been condensed within the exhaust pipe 120 to flow out of the exhaust pipe 120 through the apertures 132 and into a collection trough 134. The fuel and water mixture FW within the collection trough 134 is directed into a collection canister 136 having a pump 138 therein that operates to pump the condensed liquids FW through a fuel and water supply conduit 137 to either the fuel tank 108 to be mixed with the fuel F contained therein or directly to an expander canister 216, as will be described below, and then to the fuel intake 102 of the engine 100.

Figure 4:
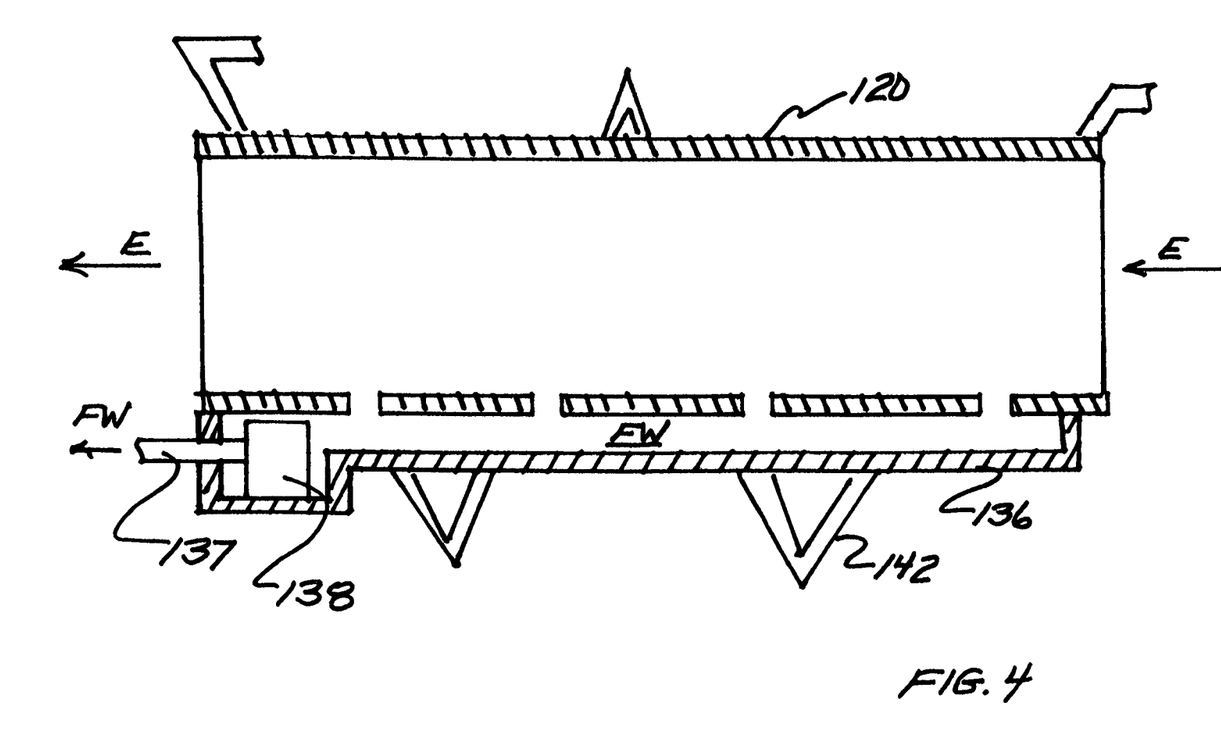
FIG. 4 is a schematic illustration of another preferred embodiment of the water injection system of the subject invention showing the condenser means comprising a plurality of exhaust pipe cooling coils placed along the outer surface of the exhaust pipe coupled to the cooling system of the engine such that heat is dissipated by circulating water or antifreeze through the cooling coils.

It should be understood that the engine's primary cooling system 126 is preferably an air cooled radiator system whereby engine heat is dissipated by the circulation of water and/or antifreeze through the engine 100 and the cooling coils (not shown) in the radiator 140. In another preferred embodiment, condenser means 123 of the system 122, as shown in FIG. 4, includes a plurality of exhaust pipe cooling coils 142 placed along the outer surface of the exhaust pipe 120 and are coupled to engine's primary cooling system 126, such as the radiator 140, so that heat is dissipated by circulating water or antifreeze through the cooling coils 142. It should be understood that the water or antifreeze within the cooling coils 142 are preferably cooled by diverting water circulating through the engine's primary cooling system 126, however it should be understood that a separate cooling system that conventionally operates to transfer heat from the water or antifreeze to the surrounding air can also be utilized. The exhaust pipe 120 is further provided with one or more apertures 132 that permit the fuel and water mixture FW that has been condensed within the exhaust pipe 120 to flow out of the exhaust pipe 120 through the apertures 132 and into a collection trough 134. The fuel and water mixture FW within the collection trough 134 is directed into a collection canister 136 having a pump 138 therein that operates to pump the condensed liquids FW through a fuel and water supply conduit 137 to either the fuel tank 108 to be mixed with the fuel F contained therein or directly to an expander canister 216, as will be described below, and then to the fuel intake 102 of the engine 100.

Figure 5:
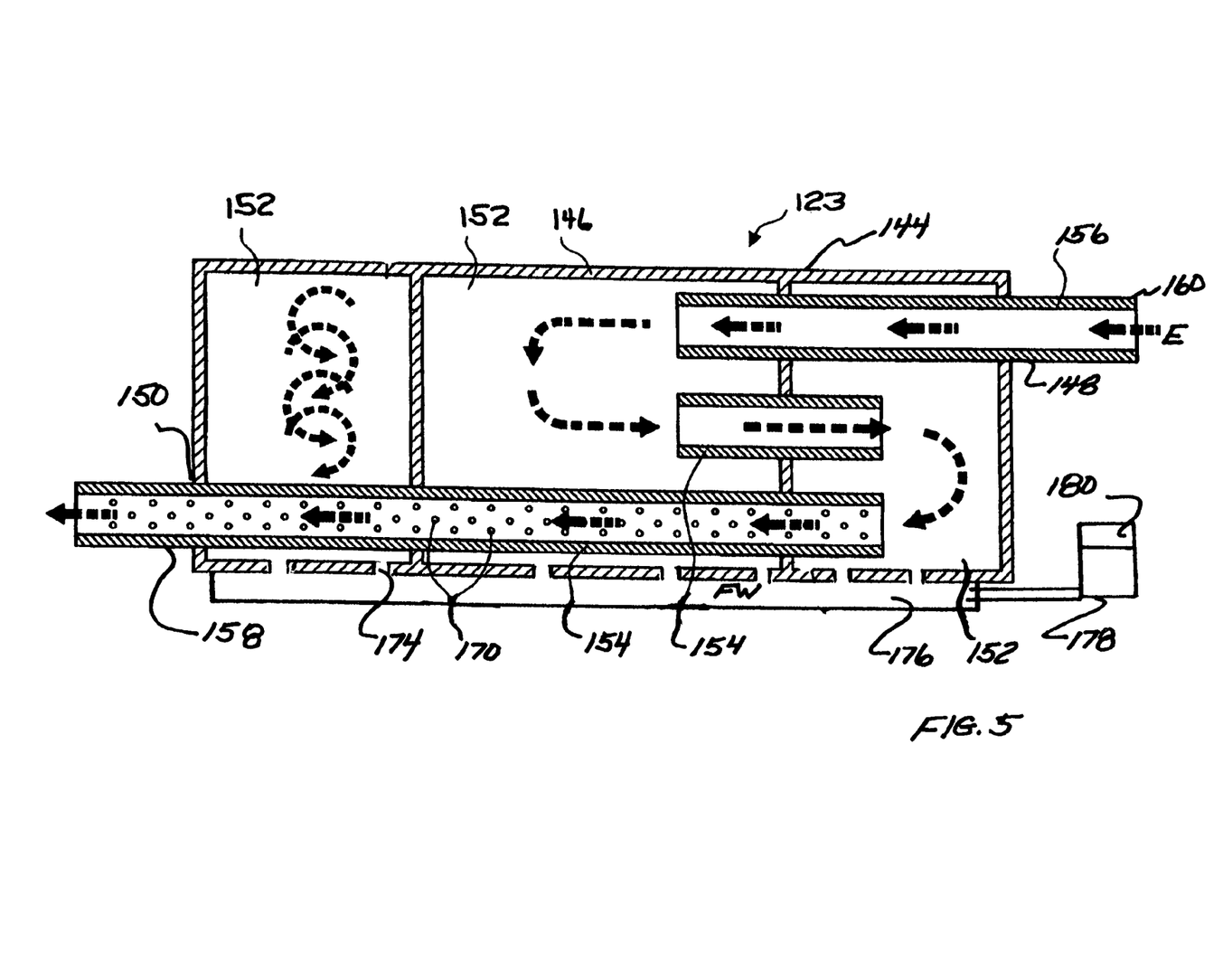
FIG. 5 is a schematic illustration of another preferred embodiment of the invention water injection system having a condenser means in the form of a muffler canister comprising a body having a forward opening and a rearward opening, and a plurality of chambers within the body.
Figure 6:
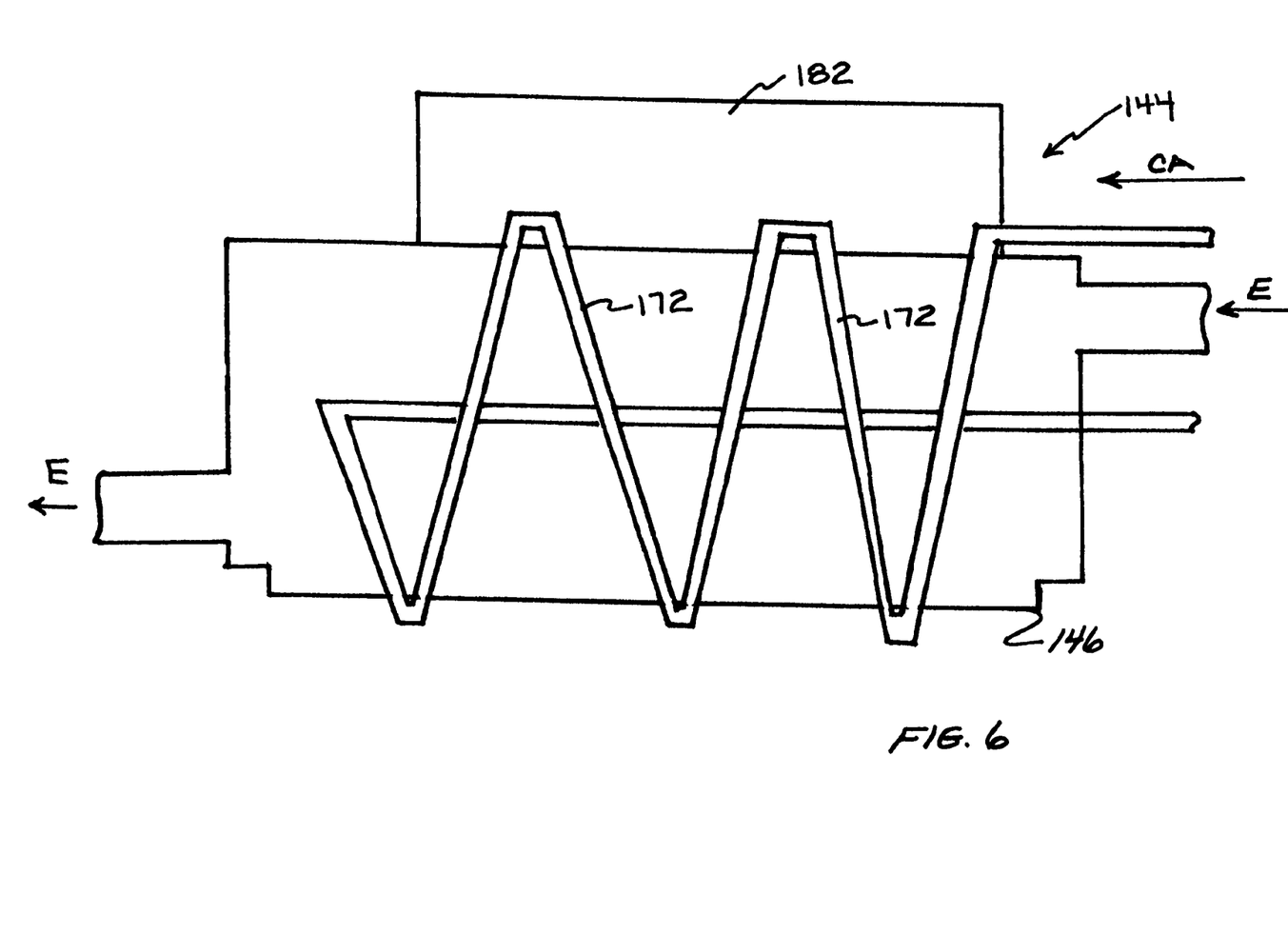
FIG. 6 is a schematic illustration of the water injection system of FIG. 5 showing the condenser means comprising a plurality of cooling coils coupled to the cooling system of the engine such that heat is dissipated by circulating water or antifreeze through a plurality of cooling coils placed along the outer surface of the muffler canister.

In another preferred embodiment of the invention, as shown in FIG. 5, the condenser means 123 of the system 122 comprises a muffler canister 144 having a generally cylindrical (as shown) or a generally oval body 146 with a forward opening 148 and a rearward opening 150, and a plurality of expansion chambers 152 within the body 146. The chambers 152 are interconnected by a series of tubes or pipes 154 to provide a circuitous flow path through the muffler canister 144 and include an intake tube 156 that extends outward through the forward opening 148 and an exhaust tube 158 extending outwardly through rearward opening 150. The intake tube 156 includes a forward end 160 adapted to connect to the exhaust pipe 120 such as by a clamp, welding, or other such conventional exhaust pipe attachment means (not shown). The exhaust tube 158 includes a rearward end 164 adapted to connect to a conventional exhaust pipe extender (not shown) such as by a clamp, welding, or other such exhaust pipe extender attachment means (not shown). In a preferred embodiment of the invention, one or more of the tubes 154 include a plurality of apertures 170 that allow exhaust circulating through the muffler canister 144 to vent out of the tubes 154 through apertures 170 and into one of the plurality of chambers 152. This venting of the exhaust operates to expand the exhaust thereby providing cooling of the exhaust and reduces the sound levels of the engine. Referring to FIGS. 5 and 6, the muffler canister 144 includes a plurality of cooling coils 172 that are coupled to the primary cooling system 126 such that heat is dissipated by circulating water or antifreeze through a plurality of cooling coils 172 placed along the outer surface 143 of the muffler canister 144. It should be understood that the water or antifreeze within the cooling coils 172 are preferably cooled by diverting water circulating through the engine's primary cooling system, however it should be understood that a separate cooling system that conventionally operates to transfer heat from the water or antifreeze to the surrounding air may be utilized.

The muffler canister 144 is further provided with one or more apertures 174 that permit the fuel and water mixture FW that has been condensed out of the exhaust within the muffler canister 144 to flow out of the body 146 of the muffler canister 144 through the apertures 174 and into a collection trough 176. The fuel and water mixture FW within the collection trough 176 is directed into a collection canister 178 having a pump 180 therein that operates to pump the condensed liquids FW through the fuel and water supply conduit 137 to either the fuel tank 108 to be mixed with the fuel F contained therein or directly to an expander canister 216, as will be described below, then to the fuel intake 102 of the engine 100 (See FIG. 2).

It should now be understood that other condensers may be used to cool the exhaust within the muffler canister 144. For example, as shown in FIG. 6, the body 146 may be provided with a plurality of cooling fins 182 formed from a metallic material, such as aluminum, that provide a relatively large cooling surface and operates to transfers heat which has been absorbed by the muffler canister 144 from the hot exhaust and conduct heat outwardly through the cooling fins 182 which cooperate with cooling air CA flowing along the external surface of the muffler canister 144 to dissipate heat to the atmosphere.

It should also now be understood that other types of designs for reducing engine noise may be utilized. For example the tube and chamber design described above may be replaced by systems having tapered passage and baffles, systems having sound absorbing materials, and other conventional system designs for dissipating or reducing sound energy. However, it should also be understood that such systems are constructed with the proper cooling means, such as those described above, to sufficiently cool the exhaust with such that any unburned fuel vapor and water vapor within the exhaust condenses back into their liquid states for delivery either to the vehicles fuel tank to be mixed with the fuel contained therein or directly to an expander canister 216, as will be described below, then to the fuel intake of the engine.

Figure 7:
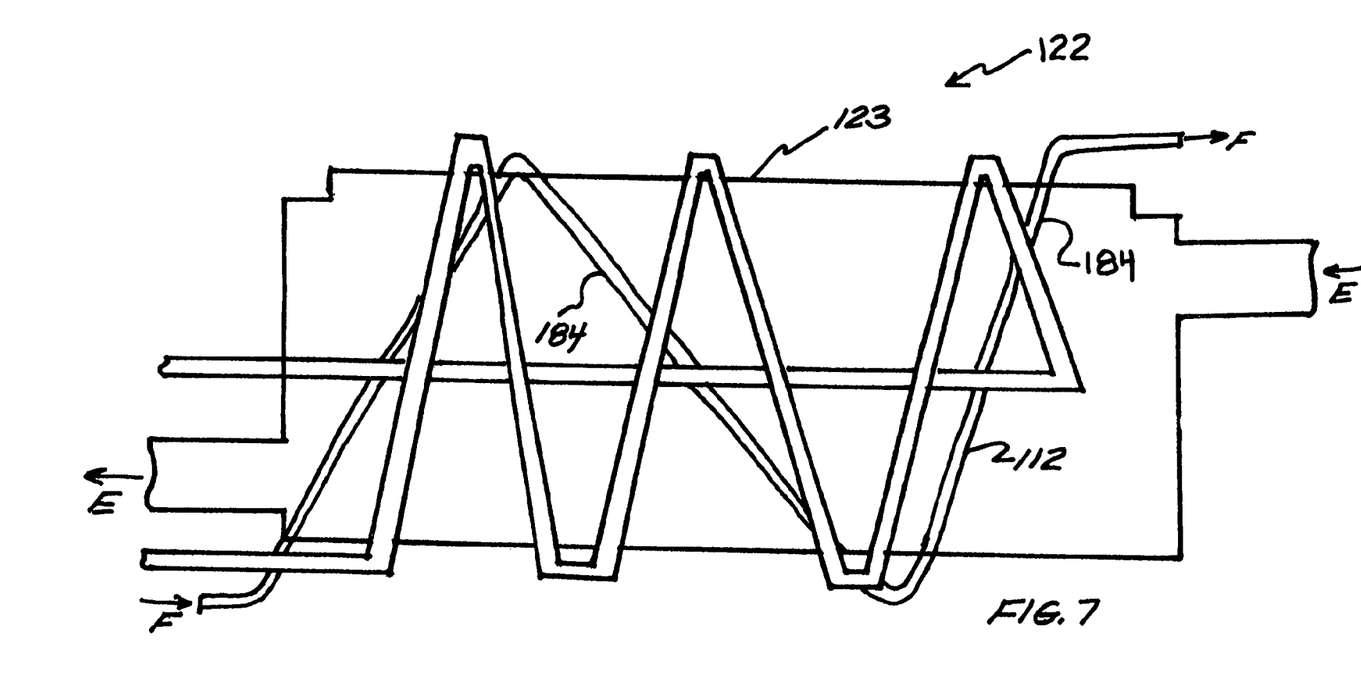
FIG. 7 is a schematic illustration of another preferred embodiment of the water injection system of the subject invention showing the fuel line comprising a plurality of coils placed around the condenser means.

In another preferred embodiment of the invention, as shown in FIG. 7, the system 122 comprises the fuel line 112 having a plurality of coils 184 that are placed around the condenser means 123. Using the fuel line 112 provides additional cooling of the exhaust while at the same time heats the fuel F within the fuel line 112 thereby increasing the power output provided by the combustion of the fuel.

Figure 8:
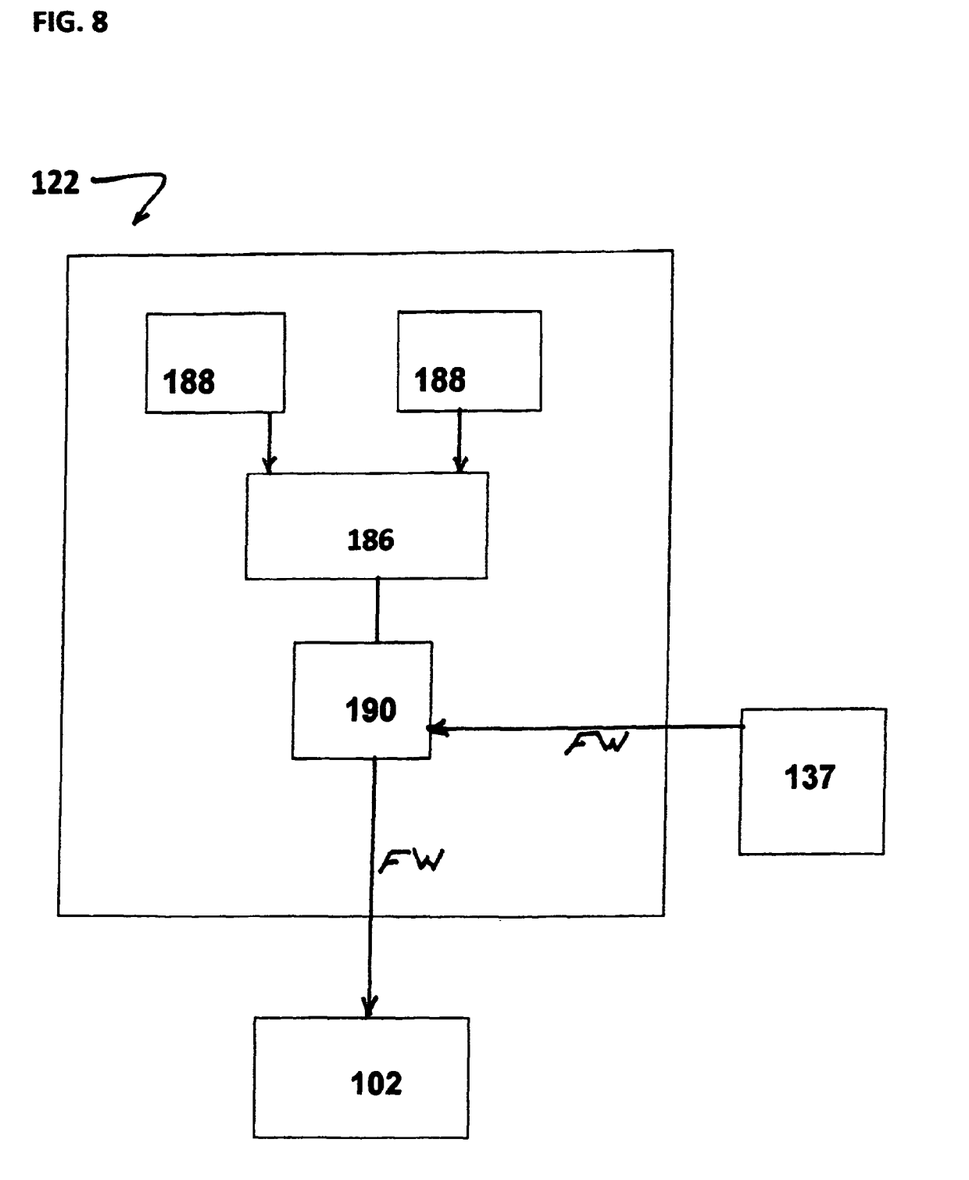
FIG. 8 is a schematic illustration of another preferred embodiment of the system of the subject invention further comprising a control device having a plurality of sensors for measuring various engine operating parameters such as fuel flow, air flow, exhaust vapor flow, engine speed, engine load, and operates to use the information to increase or decrease the fuel and vapor mixture F/W entering the fuel intake.

In another preferred embodiment of the invention, as shown in FIG. 8, the fuel and water mixture FW that has been condensed out of the engine exhaust E is directed to an expander canister 216, as will be described below, then to the fuel intake 102 of the engine 100 (FIG. 1). The system 122 further comprises a control device 186, such as a microprocessor, and a plurality of sensors 188 for measuring various engine operating parameters such as fuel flow, air flow, vapor flow, engine speed, engine load, such information can then be used by the control device 186 to increase or decrease the fuel and water vapor mixture FW entering the fuel intake 102, such as by use of a solenoid controlled valve 190 connected to the vapor mixture supply conduit 137.

Figure 9:
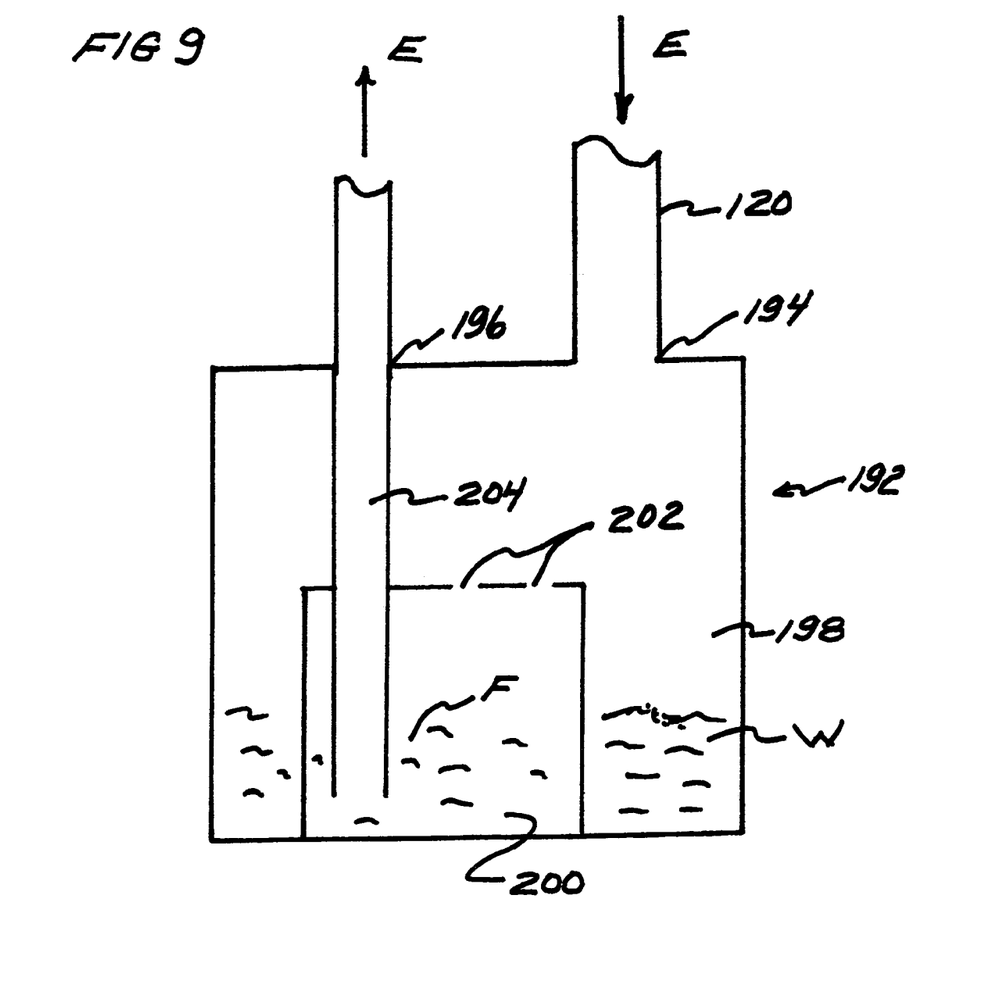
FIG. 9 is a schematic illustration of another preferred embodiment of the water injection system of the subject invention showing a condenser canister having a first chamber for condensing water vapor into a liquid state and a second chamber for condensing fuel vapor from engine exhaust into a liquid state.
Figure 10:
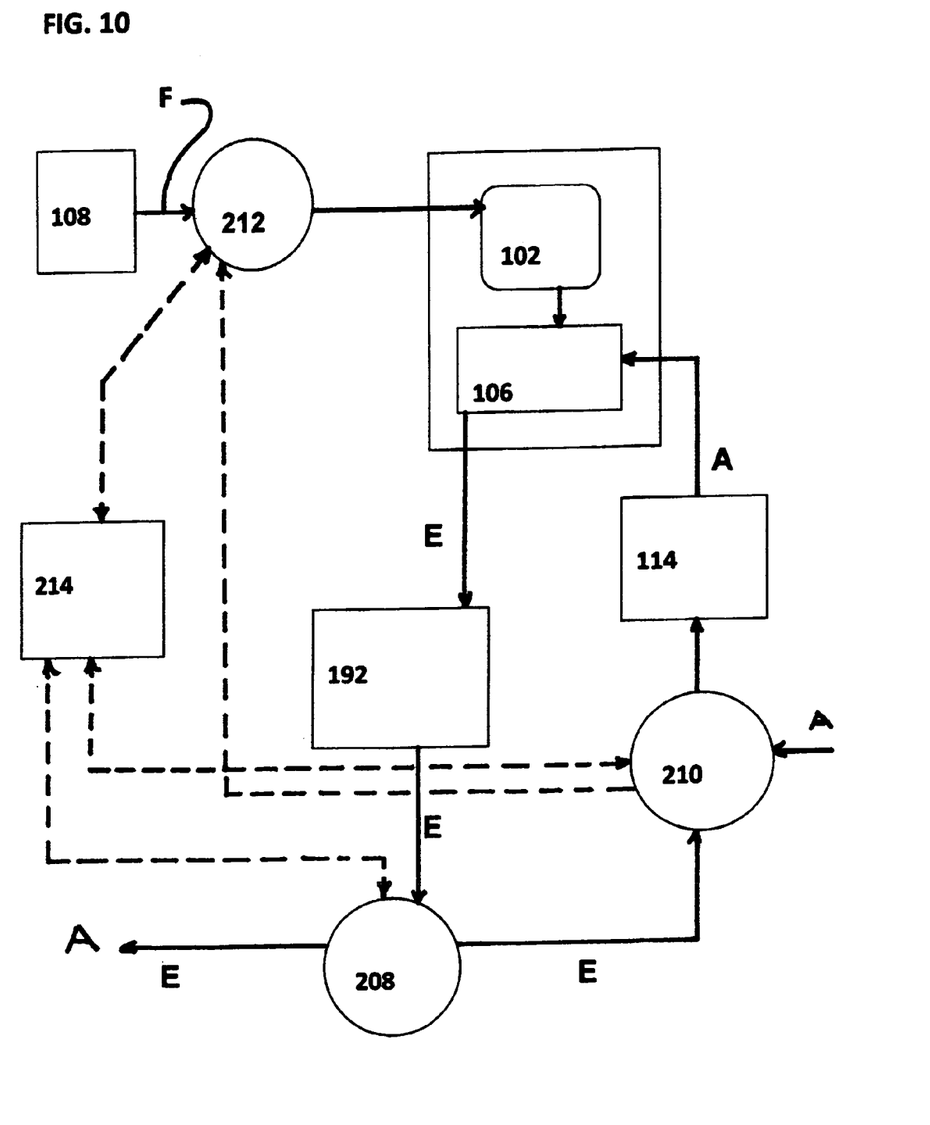
FIG. 10 is a schematic illustration of the preferred embodiment of the water injection system of FIG. 9 showing the engine and control system.

Referring to FIGS. 9 and 10, another preferred embodiment of the system 122 is shown whereby engine exhaust E is directed to a condensor means 123 comprising a canister 192 having an exhaust input 194, an exhaust output 196, a first chamber 198, and a second chamber 200. Exhaust E traveling through the exhaust pipe 120 is directed through the exhaust input 194 and enters the first chamber 198. Preferably, within the first chamber 198 is the second chamber 200 and includes one or more openings 202 that permits flow communication between the first chamber 198 and the second chamber 200. Extending outwardly from the second chamber 200 is an exhaust tube 204 that extends out through the exhaust output 196. It has been unexpectedly found that as the exhaust E enters into the first chamber 198, it begins to cool and condenses the water vapor contained within the exhaust E forming water W. The water can then be drained from the first chamber 198 and directed to an expander canister 216, as will be described below, then to the engine 100 where it is mixed with fuel F entering the fuel intake 102. It has also been unexpectedly found that as pressure within the first chamber 198 increases, the exhaust E contained within the first chamber 198 enters into the second chamber 200 through openings 202 where it is further cooled such that any fuel vapor in the exhaust condenses forming a liquid containing a large amount of fuel F. The fuel F can then be drained from the second chamber 200 and directed to either the fuel tank 108 or to an expander canister 216, as will be described below.

Referring to FIG. 10, as schematically illustrated, fuel F contained within a fuel tank 108 is pumped into the fuel intake 102 of the engine 100 where it is vaporized of formed into a fine spray and directed to one or more combustion chambers 106. Atmospheric air A entering the air intake 114 directs air A to the one or more combustion chambers 106 where it is mixed with fuel F and ignited. The resulting exhaust E of the engine is then directed to the condensing canister 192 where it is directed to the fuel tank 108 or to a collection canister 178 for future use or to an expander canister 216, as will be described below. In a preferred embodiment of the invention, the vapors V leaving the expander canister 216 are monitored by a first sensor and valve assembly 208 where if the fuel/air ratio is within a predetermined range the first sensor and valve assembly 210 opens to allow the vapors V to flow to the air intake 114 where it is mixed with a desired amount of atmospheric air A and directed to the combustion chambers 106. Preferably, it has been found that the desired air/fuel ration for most conventional internal combustion engines used for automobiles should be about 14.7/1. In the event that the fuel/air ratio is outside the predetermined range, the first sensor and valve assembly shuts to allow the vapors V to be directed through the exhaust pipe 120 and out into the atmosphere. In another preferred embodiment, a second sensor and valve assembly 210 is provided to measure the fuel/air ratio of the vapors V and automatically increases or decreases the amount of atmospheric air A entering the air intake 114 that mixes with the vapors V. In another preferred embodiment of the invention a third sensor and valve assembly 212 can be provided to monitor the fuel/air ratio of the air entering the air intake 114 and automatically adjust the amount of fuel F entering the fuel intake 102 of the engine 100. It should be understood that the sensor and valve assemblies can be electrically connected to a microprocessor 214 or a conventional engine management computer (ECU) that receives signals from the sensor and valve assemblies and automatically regulates them (adjusting the opening or the shutting the valves) to ensure that the proper stoichiometric fuel/air ration for the engine is maintained.

Figure 11:
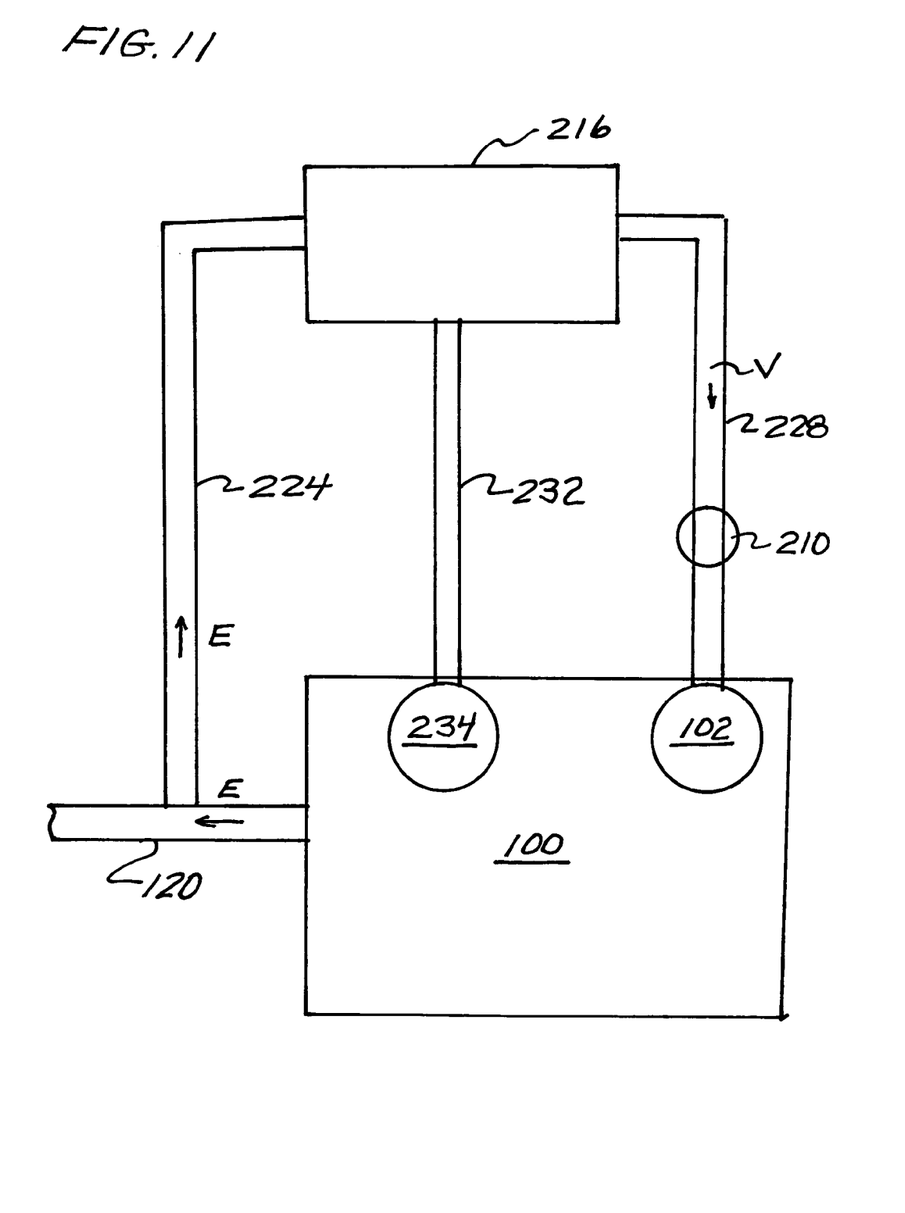
FIG. 11 is a schematic illustration of another preferred embodiment of the invention showing exhaust from an internal combustion engine being directed to an expander canister through an exhaust conduit formed from copper or a copper alloy or other suitable catalyst.
Figure 12:
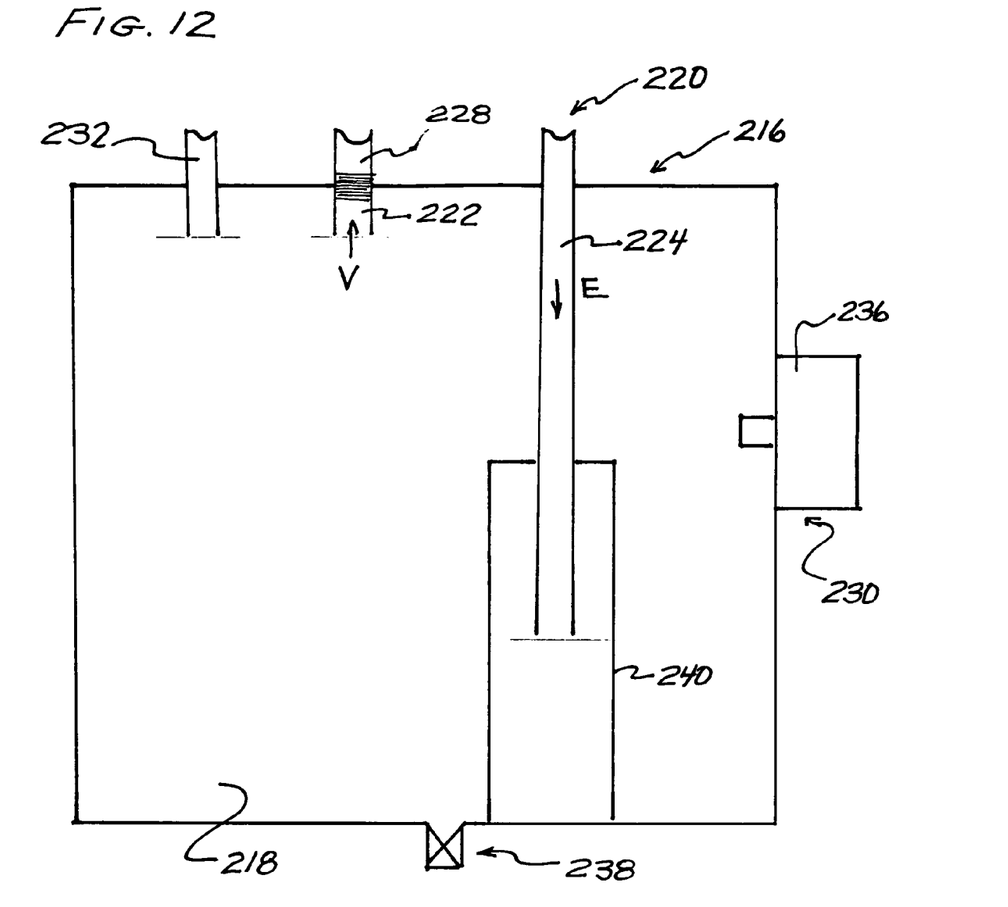
FIG. 12 is a schematic illustration of the expander canister of FIG. 11 effective for expanding the exhaust to ensure the proper mixture of water vapor and fuel vapor going to the engine intake.

Referring to FIGS. 11 and 12, another preferred embodiment is shown whereby the system 122 includes an expander canister 216 having an internal cavity 218, an exhaust input 220 and an exhaust output 222. An elongated exhaust conduit 224 formed from copper or a copper alloy is coupled at one end to be received in the exhaust input 220 the other end is coupled to an opening (not shown) in the exhaust pipe 120 and operates to direct a portion of the exhaust from the exhaust pipe 120 to the expander canister 216. Exhaust output 222 is coupled to a tube or hose 228 that directs exhaust, such as a mixture of Hydrocarbons, Carbon Monoxide, Nitrogen Oxide, Air, Carbon Dioxide, and Water formed within the expander canister 216 to the fuel intake 102 of the engine 100. The expander canister 216 further includes a vacuum valve 230 cooperating with a vacuum tube or hose 232 which has a second end coupled to vacuum source 234, such as found in the intake manifold of an engine. In a preferred embodiment the vacuum in the internal cavity 218 within the expander canister 216 to increase or decrease the vapors being fed through the tube or hose 228 to the fuel intake 102 of the engine 100. In a preferred embodiment of the invention the vacuum valve 230 operates as a regulator and further comprises a meter 236 for precisely monitoring the pressure within the internal cavity 218. The expander canister 216 further comprises a fluid release valve 238 for regulating the amount of exhaust that has been condensed into a liquid state within the expander canister 216 and a screen 240 for reducing the amount of particulates from entering into the hose 228 and being injected into the engine 100. Preferably, the elongated exhaust conduit 224 is a formed from a copper or copper alloy or a metallic tubing having an internal copper plating that is about 15-30 feet in length (450-1000 cm) with an internal diameter of about 0.25-0.5 inches (0.63-1.3 cm). It has surprising been found that the use of copper for directing and/or contacting exhaust to the expander canister 216 significantly improves the power and the fuel usage of the engine. It is believed that the copper operates as a catalyst which facilitates effective combustion of fuel and captures Nitrogen from the Nitrogen Oxide thereby increasing the Oxygen content in the vapors that facilitates more effective combustion improving the power output of the engine and fuel mileage.

In operation, the system operates such that a relatively low internal pressure is formed within the internal cavity 218 within the expander canister 216. The relatively low pressure operates such that portion of the engine exhaust E being expelled through the exhaust pipe 120 is diverted into the exhaust conduit 224 and directed into the internal cavity 218 of the expander canister 216. The pressure within the internal cavity 218 is adjusted using the vacuum valve 230. Preferably, the user can precisely regulate the pressure by use of the meter 236. It has been found that the pressure within the internal cavity 218 can increase or decrease the performance of the system and the engine and is dependent on the size of the engine, the length and inner diameter of the exhaust conduit 224 as well as other factors. It should now be apparent to one skilled in the art that the desired pressure within the internal cavity 218 can be easily adjusted by a user to provide the best performance of the engine 100. The portion of the engine exhaust travels through the exhaust conduit 224 and enters into the internal cavity 218 if the expander canister where the exhaust expands such that exhaust that has been condensed into a liquid state as a result of the exhaust conduit is returned to a vapor state and mixed whereby it is directed into the fuel intake 102 of the engine 100 through hose 228. It should be understood that any excess liquid that is within the internal cavity 218 is released out of the internal cavity 218 through fluid release valve 238.

Figure 13:
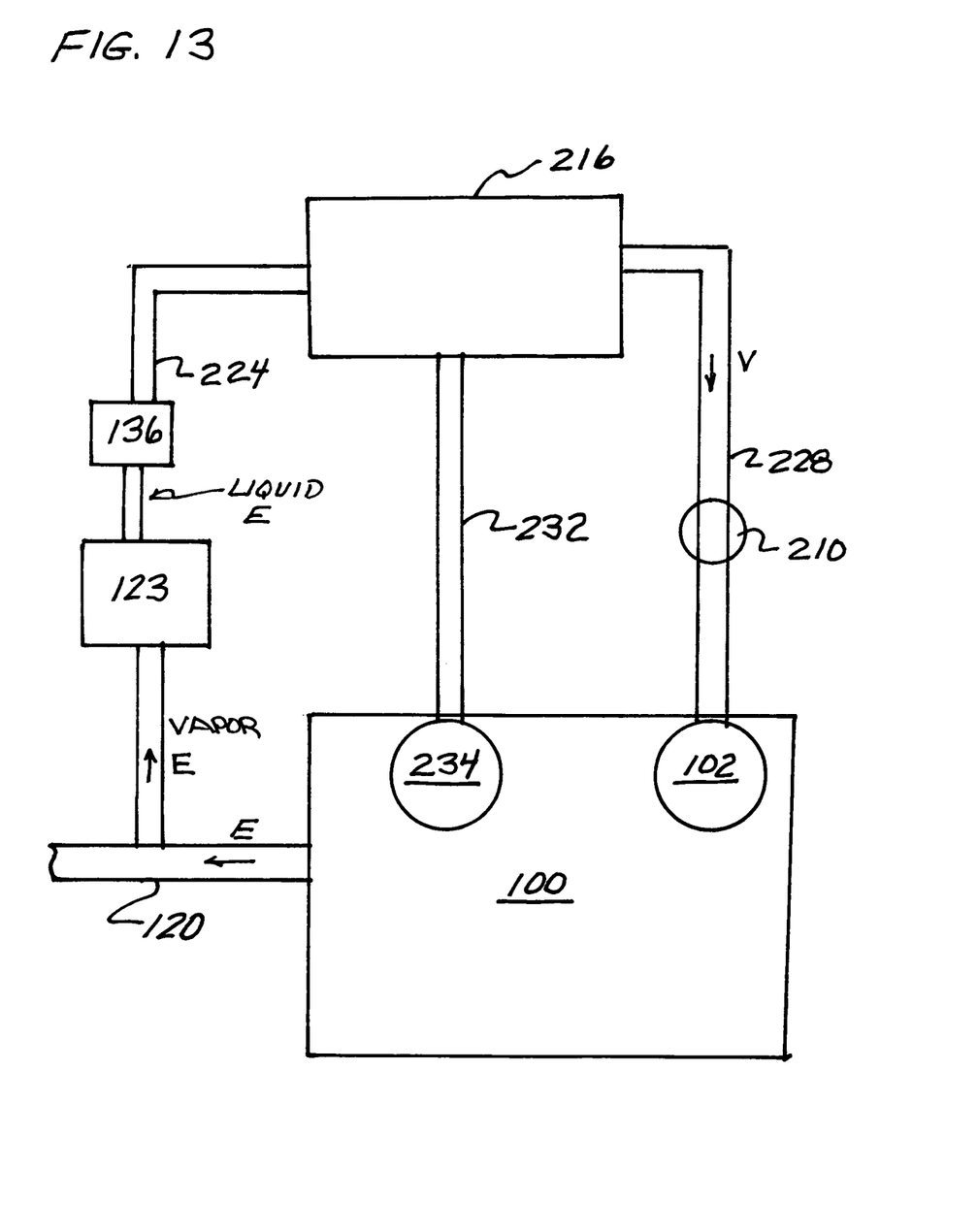
FIG. 13 is a schematic illustration of another preferred embodiment of the invention showing exhaust vapors from an internal combustion engine being condensed into a liquid state form for storage in a reservoir and then being directed to the expander canister of FIG. 12 to place the condensed liquids back into a vapor state.

It should be understood that the exhaust conduit 224 can be coupled directly to the exhaust pipe 120 of the internal combustion engine 100 as described above or can be coupled to an output of a condenser system 122, such as described above, that condenses exhaust gas into a liquid state and directs the condensed liquid to a collection canister 176. In a preferred embodiment, the elongated exhaust conduit 224 is in flow communication with the collection canister such that when required, condensed liquid in the collection canister 178 is directed to the expander canister 216 where the liquid is expanded and the vacuum pressure within the internal cavity 218 operates to vaporize the liquid and directs the vapor to the engine for combustion.

It should now be apparent to those skilled in the art that the internal combustion engine and the system of the subject invention provides a relatively inexpensive method and apparatus that increases the efficiency of the engine, reduces pollutants, and reduces the amount of unburned fuel from being expelled into the atmosphere. It should also now be apparent that the system having a water injection system eliminates the need of the user adding water to a water storage system of prior water injection systems and accordingly reduces the weight and size requirements necessary for storing water necessary in prior art systems. Further, the copper, copper alloy or copper plating used for the elongated exhaust conduit operates as a catalyst which is believed to facilitate effective combustion of fuel and captures Nitrogen from the Nitrogen Oxide thereby increasing the Oxygen content in the vapors which further facilitates more effective combustion thereby significantly improving the power output of the engine and fuel mileage.

Although the foregoing invention has been described in some detail for purposes of clarity of understanding, it should be apparent that certain changes and modifications may be practiced within the scope of the appended claims. Furthermore, it should be noted that there are alternative ways of implementing the method and article for implementing the method of the present invention. Accordingly, the present embodiments and examples are to be considered as illustrative and not restrictive, and the invention is not to be limited to the details given herein, but may be modified within the scope and equivalents of the appended claims.

I claim:

1. A system for use with an internal combustion engine having at least one combustion chamber, a fuel intake for receiving fuel and transferring the fuel to said combustion chamber, an air intake for receiving air and transferring the air to said combustion chamber, means for igniting said fuel for creating power and exhaust, and an exhaust pipe for receiving the exhaust from the combustion chamber, said system comprises:
an expander canister having an input and an output and effective for transforming liquid water/fuel into vapor;
an exhaust conduit formed from copper or a copper alloy and operates to direct a portion of the exhaust from the exhaust pipe to said input of said expander canister;
an intake conduit for directing the vapor from the expander canister into the fuel intake of engine.

2. The system of claim 1 further comprises a vacuum pressure regulator coupled to the expander canister having a valve for increasing or decreasing the vacuum within the expander canister to ensure liquid fuel and water are transformed into vapor.

3. The system of claim 1 wherein said expander canister has a fluid release valve for regulating the amount of liquid within the expander canister.

4. The system of claim 2 further comprising a vacuum meter to precisely control the vacuum within the expander canister.

5. The system of claim 1 further comprising a screen for preventing particle matter from entering said intake conduit.

6. The system of claim 1 further comprising a condenser means for condensing exhaust into a liquid state.

7. The system of claim 6 further comprising a collection canister for storing condensed exhaust prior to being transferred to the expander canister.

8. A system for use with an internal combustion engine having at least one combustion chamber, a fuel intake for receiving fuel and transferring the fuel to said combustion chamber, an air intake for receiving air and transferring the air to said combustion chamber, means for igniting said fuel for creating power and exhaust, and an exhaust pipe for receiving the exhaust from the combustion chamber, said system comprises:
a condenser means for condensing a portion of the exhaust and transforming the exhaust into its liquid state;
a collection canister in flow communication with said condenser means for storing the exhaust in its liquid state;
an expander canister having an input in flow communication with said collection canister through an exhaust conduit and an output in flow communication with the combustion chamber of the engine, wherein the expander canister is effective for transforming the liquid state of the exhaust into vapor;
wherein said an exhaust conduit is formed from copper or a copper alloy such that said copper or copper alloy contacts said liquid state of the exhaust.

9. The system of claim 8 wherein said condenser means comprises a fluid cooling system and a plurality of exhaust pipe cooling coils placed along the outer surface of the exhaust pipe for receiving circulating cooling fluid.

10. The system of claim 8 wherein said condenser means comprises a fluid cooling system and a cooling jacket in fluid communication with the fluid cooling system.

11. The system of claim 8 wherein said condenser means comprises a plurality of cooling fins for dissipating heat from the exhaust pipe.

12. The system of claim 8 wherein said condenser means comprises a fluid cooling system and a muffler canister having a plurality of expansion chambers and a plurality of cooling coils in fluid communication with said fluid cooling system.

13. The system of claim 8 further comprises a vacuum pressure regulator coupled to the expander canister having a valve for increasing or decreasing the vacuum within the expander canister to ensure liquid fuel and water are transformed into vapor.

14. The system of claim 8 wherein said expander canister has a fluid release valve for regulating the amount of liquid within the expander canister.

15. The system of claim 8 further comprising a vacuum meter to precisely control the vacuum within the expander canister.

16. The system of claim 8 further comprising a screen for preventing particle matter from entering said intake conduit.

* * * * *